Patented Mar. 21, 1950

2,500,930

UNITED STATES PATENT OFFICE 2,500,930

PROCESS FOR REFINING RUTIN

James F. Couch, Glenside, and Charles F. Krewson and William L. Porter, Philadelphia, Pa., assignors to United States of America as represented by the Secretary of Agriculture No Drawing. Application July 23, 1946, Serial No. 685,632

7 Claims. (Cl. 260—210)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to a process for refining rutin, a glucoside derived from buckwheat and other plants and extensively used in medicine as an anti-hemorrhagic. As ordinarily prepared from buckwheat, rutin contains extraneous substances as impurities, which substances are difficult or impossible to separate from rutin by the usual methods employed by chemists for the purification of chemical compounds. One reason is that the solubilities of the extraneous substances are such that they are not removed by recrystallization. Another reason is that they tend to be adsorbed on the crystallizing rutin and hence to be carried down with it. A further reason is that rutin tends to form mixed crystals with the extraneous substances so that they crystallize together.

The presence of these extraneous substances may be readily detected by subjecting the recrystallized rutin to spectrophotometric analysis. Pure rutin, free from extraneous substances, furnishes a transmission curve of a smooth type between 400 and 750 millimicrons. Rutin that contains the extraneous substances furnishes a transmission curve containing definite peaks at or about wave lengths of 592 and 640 m$\mu$. When larger quantities of the impurities are present, lesser peaks are obtained at wave lengths below 592 m$\mu$, viz., at about 550 and 480 m$\mu$ and below.

The peak at 592 m$\mu$ is caused by the presence of one or more substances that have the property of sensitizing susceptible persons and animals to light from the sun, or sun-lamp, or source of similar radiation. This condition is termed photosensitization. Persons and animals sensitized in this way develop a more or less severe sunburn, when exposed to appropriate radiation. The sunburn may be so extensive as to be very serious, even to the point of endangering life. This condition is well recognized in medical circles under the name of fagopyrism and is described in medical treatises.

Rutin is administered to patients daily for prolonged periods. While the single dose is small, 20 mg. three times a day, the aggregate quantity that would be consumed in a year would be large, approximately 22 g. The continued ingestion of even minute traces of the substance which produces sensitization may lead, in time, to a cumulative effect and render the patient susceptible to the active radiation. Since rutin is used during pregnancy to avoid certain hemorrhagic conditions, rutin contaminated with this substance may adversely affect the child as well as the mother.

It is evident, therefore, that rutin intended for medical use should be absolutely free from photosensitizing substances.

Rutin may be refined from these substances by a process which may be termed "selective adsorption." In this process, the impure rutin is subjected to the action of some reagent that has a greater adsorbing power for the photosensitizing substance than for rutin, and which can separate the said substance from its complex with rutin.

Silica gel excels as a selective adsorbent for this purpose. Other adsorbents are effective, but are less efficient than silica gel. We have used activated alumina, infusorial earth, and activated wood charcoal for this purpose. Examples of the application of all these substances are given below. It is evident that this list does not exhaust the possible number of adsorbents that may be used.

Example I

A 1 g. sample of dried buckwheat rutin, which had been repeatedly recrystallized from hot distilled water but which still contained impurities, having characteristic absorption bands in the range of the visible spectrum at approximately 592 m$\mu$ and 660 m$\mu$ when examined spectrophotometrically, was dissolved in 200 ml. of boiling distilled water. After the rutin had dissolved, 0.3 g. of silica gel was added to the solution, and boiling continued for one minute. The hot solution was then filtered and set aside for rutin to crystallize. After standing overnight, the rutin was filtered off and dried to constant weight at 110° C. The weight of dried rutin obtained was 0.91 g. Spectrophotometric examination showed that this rutin was free of impurities.

Example II

The above procedure was repeated, except that 0.2 g. of activated charcoal was used in place of the silica gel. In this case, it was necessary to repeatedly filter the hot activated charcoal-treated rutin solution in order to clarify it. The activated charcoal residue was washed with four 5 ml. portions of boiling water to remove adsorbed rutin, and the washings were added to the original filtered rutin solution. The yield of dry rutin was 0.68 g. It was free of impurities when examined spectrophotometrically.

Example III

The procedure cited in Example I was repeated, using 0.5 g. of activated alumina instead of silica gel. The weight of rutin obtained was 0.64 g. Its color was brilliant yellow, indicating that considerable degradation had occurred. However, the product showed no impurities in the visible spectrum when examined spectrophotometrically.

Example IV

A repetition of Example I, using 0.5 g. of infusorial earth instead of silica gel, gave 0.79 g. of dry rutin. It was necessary to filter the hot rutin solution repeatedly in this experiment for purposes of clarification. No impurities were present in the rutin so treated, as shown by spectrophotometric analysis.

Water was used in our experiments as a convenient solvent, but we do not limit the application of this invention to water solutions. It is obvious that other solvents for rutin may be employed.

Our process is capable of general application to purification of rutin derived from buckwheat and other sources. Its principal application is in removing the photosensitizing substances present in the rutin derived from buckwheat and kindred materials. Our purification process is applicable to the rutin derived from buckwheat by the process described in the copending application of Roderick Keenig Eskew, Serial No. 675,119, filed June 7, 1946. The process of Eskew involves, for example, extracting the rutin from buckwheat with boiling water, and then, preferably, evaporating under vacuum to a viscous concentrate; adding an equal volume of 95 per cent alcohol (by volume), such as ethyl, methyl, isopropyl, or butyl, to agglomerate the colloidal materials into a filterable curd; boiling to insure complete solution of the rutin; cooling, then filtering off the curd from the alcoholic solution of rutin; and evaporating the alcohol.

Having thus described our invention, we claim:

1. A process for removing skin-photosensitizing impurities from rutin obtained from buckwheat by extraction with hot aqueous medium, comprising: contacting a boiling solution of the rutin in water with an adsorbent taken from the group consisting of silica gel, activated alumina, infusorial earth, and activated carbon; separating the adsorbent plus the adsorbent impurities; and crystallizing rutin from the aqueous solution.

2. The process of claim 1 in which the adsorbent is silica gel.

3. The process of claim 1 in which the adsorbent is infusorial earth.

4. The process of claim 1 in which the adsorbent is activated carbon.

5. The process of claim 1 in which the adsorbent is activated alumina.

6. A process for removing skin-photosensitizing impurities from rutin obtained from buckwheat by extraction with hot aqueous medium, comprising: contacting a boiling solution of the rutin in water with silica gel, the weight of the silica gel being less than the weight of the rutin, maintaining the boiling solution in contact with silica gel until the said impurities are adsorbed by the silica gel; and crystallizing purified rutin from the aqueous solution.

7. A process for removing skin-photosensitizing impurities from rutin obtained from buckwheat by extraction with hot water, comprising: maintaining a boiling solution of the impure rutin in water in contact with an adsorbent taken from the group consisting of silica gel, activated alumina, infusorial earth, and activated carbon, the weight of the adsorbent being less than that of the rutin, until the adsorbent adsorbs said impurities, and crystallizing purified rutin from the aqueous solution.

JAMES F. COUCH.
CHARLES F. KREWSON.
WILLIAM L. PORTER.

REFERENCES CITED

The following references are of record in the file of this patent:

UNITED STATES PATENTS

| Number | Name | Date |
|---|---|---|
| 1,849,576 | Karrer | Mar. 15, 1932 |

OTHER REFERENCES

Strain: "Chromatographic Adsorption Analysis," revised reprint 1945, pp. 12–13, 2 pages.

Chemical Abstracts, v. 3 (1909), p. 316, 1 page.

Borntrager: Ann. der Chemie, v. 53 (1845), pp. 385–386, 2 pages.

Bureau of Agricultural and Industrial Chemistry, Circular 114, Apr. 1946, page 9, 1 page; Circular 115, Apr. 1946, page 2, 1 page.

Chromatography, Zechmeister and Cholnoky translated 2nd edition by Bacharach and Robinson, John Wiley & Sons Inc. (1941), pages 42–53.